United States Patent
Barkow et al.

(10) Patent No.: US 12,394,570 B2
(45) Date of Patent: Aug. 19, 2025

(54) FILM CAPACITOR AND MOTOR VEHICLE

(71) Applicant: Dr. Ing. h.c. F. Porsche Aktiengesellschaft, Stuttgart (DE)

(72) Inventors: Maximilian Barkow, Stuttgart (DE); Timijan Velic, Weissach (DE); Karl Dums, Renningen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 199 days.

(21) Appl. No.: 18/190,150

(22) Filed: Mar. 27, 2023

(65) Prior Publication Data

US 2023/0326683 A1    Oct. 12, 2023

(30) Foreign Application Priority Data

Apr. 4, 2022    (DE) .......................... 102022107961.9

(51) Int. Cl.
*H01G 4/32*    (2006.01)
*B60R 16/033*    (2006.01)
*H01G 4/258*    (2006.01)

(52) U.S. Cl.
CPC .............. *H01G 4/32* (2013.01); *H01G 4/258* (2013.01); *B60R 16/033* (2013.01)

(58) Field of Classification Search
CPC .................................. H01G 4/32; H01G 4/258

USPC ............................................ 361/301.4, 301.5
See application file for complete search history.

(56) References Cited

U.S. PATENT DOCUMENTS

| | | | |
|---|---|---|---|
| 7,604,719 B2 * | 10/2009 | Vanden Bussche | C25B 9/17 205/466 |
| 2009/0286685 A1 * | 11/2009 | Kramer | H01F 27/2871 336/206 |
| 2017/0210587 A1 * | 7/2017 | Canning | B65H 75/08 |
| 2018/0090277 A1 * | 3/2018 | Kikuchi | H02P 27/06 |

FOREIGN PATENT DOCUMENTS

| | | | |
|---|---|---|---|
| DE | 102016213753 A1 | 2/2018 | |
| EP | 1569252 B1 | 5/2008 | |
| JP | 2005244234 A * | 9/2005 | ............ H01G 11/04 |
| JP | 2013172141 A | 9/2013 | |
| WO | WO 2016013327 A1 | 1/2016 | |
| WO | WO-2018019508 A1 * | 2/2018 | |

* cited by examiner

*Primary Examiner* — Arun Ramaswamy
(74) *Attorney, Agent, or Firm* — LEYDIG, VOIT & MAYER, LTD.

(57) ABSTRACT

A film capacitor including a core, a plurality of film layers wrapped around the core, and at least one first spacer arranged between two first film layers of the plurality of film layers, wherein an interstice configured outside of a spacer cross-section is provided between the two first film layers by the at least one first spacer.

16 Claims, 1 Drawing Sheet

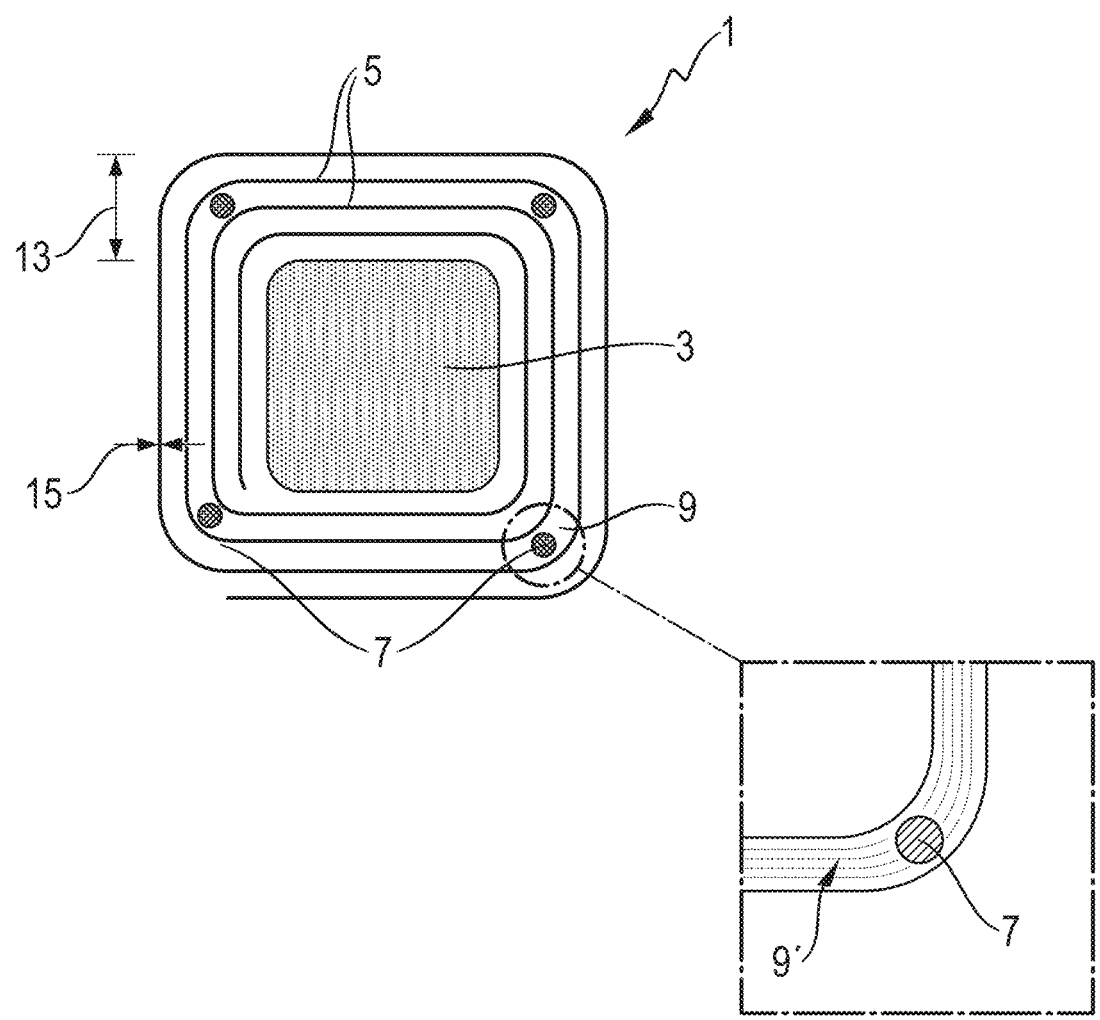

FILM CAPACITOR AND MOTOR VEHICLE

CROSS REFERENCE TO RELATED APPLICATIONS

This application claims benefit to German Patent Application No. DE 10 2022 107 961.9, filed on Apr. 4, 2022, which is hereby incorporated by reference herein.

FIELD

The present invention relates to a film capacitor. The invention further relates to a motor vehicle having such a film capacitor.

BACKGROUND

Film capacitors are used in a plurality of applications. Compared to accumulators, they have significantly lower energy densities. However, they can be distinguished by their significantly higher power densities. Consequently, they can be charged and discharged much faster and thus subjected to a significantly greater number of switching cycles. The shorter charging and discharging times, as well as the higher number of switching cycles, can in turn result in a large thermal load.

From the prior art, film capacitors are well known. For example, EP 1 569 252 B1 discloses a film capacitor comprising a carrier material around which a film is wrapped. The film is formed from a dielectric material, on the surfaces of which electrodes are provided. In this respect, the film wrapped around the carrier material forms several film layers that are wrapped around the carrier material as a core. Spacers are arranged at corners of the film capacitor for shaping and providing mechanical stability, in order to achieve a desired design, in particular a compact design, and a good use of design space. However, a compact design results in the disadvantage of a high thermal load.

SUMMARY

In an embodiment, the present disclosure provides a film capacitor comprising a core, a plurality of film layers wrapped around the core, and at least one first spacer arranged between two first film layers of the plurality of film layers, wherein an interstice configured outside of a spacer cross-section is provided between the two first film layers by the at least one first spacer.

BRIEF DESCRIPTION OF THE DRAWING

Subject matter of the present disclosure will be described in even greater detail below based on the exemplary FIGURE. All features described and/or illustrated herein can be used alone or combined in different combinations. The features and advantages of various embodiments will become apparent by reading the following detailed description with reference to the attached drawings, which illustrate the following:

FIG. 1 illustrates a film capacitor according to an embodiment of the invention schematically in a sectional view.

DETAILED DESCRIPTION

In an embodiment, the present invention provides a film capacitor with a compact design, the thermal stress of which is reduced.

In an embodiment, a film capacitor is providing having a core, several film layers wrapped around the core, and at least one first spacer arranged between two first film layers, wherein an interstice configured outside of a spacer cross-section is provided between the two first film layers by means of the first spacer.

The film capacitor according to an embodiment of the invention comprises a core, which can be understood as a carrier or base body for film layers wrapped around the core. The core allows for some mechanical stability of the film capacitor. The three-dimensional configuration of the core can also determine the cross-section of the film capacitor and thus the profile of the wrapped film layers. Plastics are possible as the core material. Ceramics or metals are also conceivable. According to an embodiment of the present invention, a first spacer is arranged between first film layers. The spacer can space the two first film layers apart from one another at the location of its positioning and thereby provide an interstice between the two first film layers outside of its own spacer cross-section. The interstice can be used for cooling the film capacitor, in particular the two first film layers.

Preferably, the film layers are a component part of a common film that is wrapped around the core. The film can be formed from a dielectric material, wherein electrodes are provided on at least one, preferably two surfaces. Alternatively, the film layers can be a component of several, in particular precisely two, films that are wrapped around the core in an alternating sequence of their film layers. These films can be formed from a dielectric material, wherein an electrode is provided on at least one surface.

According to a preferred embodiment of the invention, it is provided that a cooling medium, in particular a dielectric liquid cooling medium, is arranged in the interstice. The cooling medium can reduce the thermal stress on the film capacitor by dissipating heat generated and stored in the individual film layers. It is conceivable that the cooling effect is achieved by a perfusion through the film capacitor, i.e. by convection, with the aid of a liquid cooling medium. Furthermore, the use of a paste-like cooling medium is conceivable. A dielectric cooling medium can also bring about or enhance the electrical separation of the two film layers.

An advantageous embodiment of the invention provides that the first spacer has a circular or oval or elliptical cross-section. Designs of the spacer comprising curves can advantageously be arranged in a corner portion of the film capacitor. Film layers can advantageously be guided around spacers comprising curves and then wrapped around the core. In this way, kinks in film layers can be avoided. Furthermore, the omission of strong folds of the film layers can enable a more homogeneous electrical field between individual film layers, in particular in corner portions of the film capacitor. Different dimensions of the spacer can also help to adjust different curvature radii in the corner portions.

In an embodiment of the invention, the first spacer has a polygonal cross-section and preferably rounded corners. Even sides of the polygonal first spacer can function as support surfaces for a respective adjoining film layer and thus allow guidance in the wrapping of the film layers. Preferably, the corners of the polygonal spacer are additionally rounded. In this way, they can also be advantageously arranged in corner portions of the film capacitor. Furthermore, rounded corners can reduce the risk of film layer damage, as pointed edges are avoided.

Preferably, the first spacer is configured as a wire. Pure metals or alloys can be used as the wire material. A spacer configured as a wire can also be divided into multiple portions by bending, wherein each portion is arranged at a different position of the film capacitor. Various portions can be utilized as functionally separate spacers. A plurality of cross-sections for the spacer configured as a wire is also conceivable. Circular or polygonal cross-sections with rounded corners are particularly advantageous. Furthermore, the wire can be coated, for example, in order to increase its thermal resistance and thus to ensure greater failure resistance.

According to a preferred embodiment of the invention, it is provided that several, in particular at least three, four, or five, first spacers are arranged between the two first film layers. A general cooling chamber created with the aid of first spacers can directly correlate with the number of spacers inserted. Furthermore, the first spacers can be arranged symmetrically with respect to a capacitor cross-section, in particular a core cross-section of the core. Preferably, one spacer and one further spacer are arranged in each corner portion of the film capacitor, laterally of the core. An enlarged general cooling chamber can absorb a larger volume of cooling medium and contribute to improved cooling performance of the film capacitor.

A further preferred embodiment of the invention provides that at least one second spacer is arranged between two second film layers, wherein further film layers are arranged between the two first film layers and the two second film layers, in particular at least 10 film layers, preferably at least 50 film layers, preferably at least 100 film layers. In this respect, the second spacers can be arranged further outward than the first spacers, in particular in a radial direction of the film capacitor, so that a further interstice between the two second film layers is provided, which can additionally contribute to the cooling of the film capacitor. Preferably, several second spacers can be arranged in the film capacitor. The second spacers can be formed identically to the first spacers. Furthermore, several third spacers can preferably be arranged between two third film layers. The third spacers can be arranged further outwards than the first and second spacers, in particular in a radial direction of the film capacitor, so that a further interstice between the two third film layers is provided, which can additionally contribute to the cooling of the film capacitor. At least 10 film layers, preferably at least 50 film layers and preferably 100 film layers, can be arranged between the first film layers and the second film layers. A sufficiently large spacing between the first and second film layers and the second and third film layers, respectively, can increase the cooling efficiency, because cooling can occur across different interstices between different film layers in different areas of the film capacitor. In other words, the cooling capacity can be distributed more evenly across the capacitor cross-section.

According to a preferred embodiment of the invention, it is provided that the core has a quadrilateral core cross-section, in particular with rounded core corners. The core can have a quadrilateral or rectangular core cross-section. The core can in particular be used for shaping the film layers wrapped around it. The film layers can be formed in a plane arranged parallel to the core cross-section in a largely quadrilateral manner with rounded film corners and can thus mimic contours of the core. A quadrilateral core with rounded corners can achieve a more compact design compared to a circular core, because, for a given quadrilateral design space, a greater wrapping volume can be achieved, and the capacity of the film capacitor can thus be increased. Furthermore, a quadrilateral core with rounded corners can produce a more homogeneous electric field compared to a purely quadrilateral core, because field inhomogeneities can be mitigated as a result of the rounding of the corner portions. A quadrilateral core with rounded corners can thus combine the advantages of purely round cores (field homogeneity) and purely rectangular cores (compactness and capacity increase).

Preferably, the rounded core corners have a radius that is smaller than a thickness of the film layers on one side of the core, wherein the thickness results from the multiplication of the number of film layers by a film thickness. A relatively small radius of the core corners relative to the thickness of the film layers can enable a particularly compact design of the film capacitor. A greater thickness of the layers of film correlating to the number of layers of film relative to the radius of the core corners can advantageously increase the ratio of a film volume that is essential for the capacity to the core volume that is insignificant for the capacity.

It is conceivable that the spacers are arranged in corner portions of the film capacitor such that the interstice is formed in substantially level areas between the corner portions. In addition, spacers can be arranged in the areas between the corner portions of the core.

In an embodiment, a motor vehicle comprising a film capacitor according to any of the above-described configurations is provided. Features, advantages, and technical effects disclosed in connection with the relevant embodiment of the film capacitor likewise relate to the motor vehicle according to embodiments of the invention, which comprises such a film capacitor.

Further features and advantages of embodiments of the invention can be found in the drawing as well as in the following with reference to the drawing. The drawing illustrates only one exemplary embodiment of the invention, which does not restrict the concept of the invention.

In FIG. 1, an exemplary and schematic film capacitor 1 according to an embodiment of the invention is illustrated. The film capacitor 1 comprises a quadrilateral core 3. Furthermore, the core 3 comprises rounded corners. A film having several film layers 5 is wrapped around the core 3, only a few of which are shown for the sake of clarity. In addition, spaces between the individual film layers 5 are shown disproportionately large for purposes of illustration in FIG. 1. In particular, the distorted proportions of the individual dimensions shown in FIG. 1 should make it clear that the film layers 5 mimic the shape of the core 3. In other words, an outer contour representing the wrapped film layers 5 when viewed together also comprises a quadrilateral cross-section with rounded corners. Rounded corners of the film layers 5 ensure a more homogeneous electrical field in contrast to a quadrilateral core 3 with pointed, rectangular corners.

Furthermore, four spacers 7 are shown in FIG. 1, each being arranged in a corner portion of the film capacitor 1. The spacers 7 have a circular spacer cross-section and can be formed, for example, from a wire. They are arranged between two first film layers 5. Each spacer 7 spaces two of the first film layers 5 in the immediate vicinity of its respective position and thereby forms an interstice 9 between the two first film layers 5.

The interstice 9 comprises a dielectric, liquid cooling medium 9', which is shown shaded in an enlarged detail view in FIG. 1. The cooling medium 9' can be conveyed through a conveying device, for example a pump, so that the cooling medium 9' can perfuse the film capacitor 1 and dissipate the heat generated therein.

The thickness 13 of the film layers 5 shown in FIG. 1 results from the product of film thickness 15 and the number of film layers 5. Due to the overly large spaces between the film layers 5 shown in FIG. 1, reference is made to the schematic nature of FIG. 1.

According to a modification of the embodiment example shown in FIG. 1, it can be provided that the film capacitor 1 comprises a plurality of further film layers that are wrapped on the outside of the first film layers 5, which enclose the first spacers 7 between them. These further film layers can be, for example, at least 10 film layers, preferably at least 50 film layers, and preferably at least 100 film layers. Second film layers, between which at least a second spacer is arranged, can be wrapped externally on these further film layers. In this respect, a further interstice between the second film layers can be provided at a further external location of the film capacitor.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C. and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Film capacitor
3 Core
5 Film layer
7 First spacer
9 Interstice
9' Cooling medium
13 Thickness
15 Film thickness

The invention claimed is:

1. A film capacitor comprising:
a core;
a plurality of film layers wrapped around the core; and
at least one first spacer arranged between two first film layers of the plurality of film layers,
wherein an interstice configured outside of a spacer cross-section and extending between the at least one first spacer and a second spacer is provided between the two first film layers by the at least one first spacer,
wherein the at least one first spacer has a circular or oval or elliptical cross-section, and
wherein the circular cross-section or the oval cross-section or the elliptical cross-section is a cross-section of a plane intersecting the core and the plurality of film layers.

2. The film capacitor according to claim 1, wherein a cooling medium is arranged in the interstice.

3. The film capacitor according to claim 1, wherein the at least one first spacer has a polygonal cross-section.

4. The film capacitor according to claim 1, wherein the at least one first spacer is configured as a wire.

5. The film capacitor according to claim 1, wherein at least three first spacers are arranged between the two first film layers.

6. The film capacitor according to claim 1, wherein, between two second film layers of the plurality of film layers, the second spacer is arranged, and
wherein, between the two first film layers and the two second film layers, further film layers of the plurality of film layers are arranged.

7. The film capacitor according to claim 1, wherein the core has a quadrilateral core cross-section with rounded core corners.

8. The film capacitor according to claim 7, wherein the rounded core corners have a radius that is smaller than a thickness of the film layers on one side of the core, and
wherein the thickness results from multiplication of a number of film layers and a film thickness.

9. A motor vehicle comprising a film capacitor according to claim 1.

10. The film capacitor according to claim 2, wherein the cooling medium is a dielectric liquid cooling medium.

11. The film capacitor according to claim 3, wherein the at least one first spacer has rounded corners.

12. The film capacitor according to claim 5, wherein at least five first spacers are arranged between the two first film layers.

13. The film capacitor according to claim 6, wherein at least 10 further film layers are arranged between the two first film layers and the two second film layers.

14. The film capacitor according to claim 6, wherein at least 100 further film layers are arranged between the two first film layers and the two second film layers.

15. The film capacitor according to claim 2, wherein the cooling medium perfuses through the interstice of the film capacitor.

16. The film capacitor according to claim 1, wherein a second interstice provided between two adjacent film layers is configured to extend from the second spacer to a third spacer.

* * * * *